United States Patent [19]
Bellegarda et al.

[11] Patent Number: 5,737,487
[45] Date of Patent: Apr. 7, 1998

[54] SPEAKER ADAPTATION BASED ON LATERAL TYING FOR LARGE-VOCABULARY CONTINUOUS SPEECH RECOGNITION

[75] Inventors: Jerome R. Bellegarda, Los Gatos; John W. Butzberger, Foster City; Yen-Lu Chow, Saratoga, all of Calif.

[73] Assignee: Apple Computer, Inc., Cupertino, Calif.

[21] Appl. No.: 600,859

[22] Filed: Feb. 13, 1996

[51] Int. Cl.$^6$ .................................................. G10L 5/06
[52] U.S. Cl. ...................... 395/25.9; 395/2.4; 395/2.55; 395/2.58
[58] Field of Search .................... 395/2.1, 2.4, 2.45, 395/2.46, 2.47–2.49, 2.55–2.59

[56] References Cited

U.S. PATENT DOCUMENTS

| | | | |
|---|---|---|---|
| 5,293,452 | 3/1994 | Picone et al. | 395/2.59 |
| 5,377,301 | 12/1994 | Rosenberg et al. | 395/2.31 |
| 5,469,529 | 11/1995 | Bimbot et al. | 395/2.55 |
| 5,579,436 | 11/1996 | Chou et al. | 395/2.53 |

OTHER PUBLICATIONS

Proc: ICASSP. "Speaker Adaptation Through Vector Quantization", K. Shikano, K. Lee, R. Reddy, Tokyo, Japan, Apr. 1986, pp. 2643–2646.

Proc: ICASSP. "Speaker Adaptation for Large Vocabulary Speech Recognition Systems Using Speaker Markov Models." Rigoll, G., Glasgow, U.K., May 1989, pp. 5–8.

Proc. ICASP, "Speaker Adaptation From a speaker-Independent Training Corpus," Kubala F., Schwartz R., Barry C., Albuquerque, NM, Apr. 1990, pp. 137–140.

IEEE Trans. Speech Audio Proc., "Multonic Markov Word Models for Large Vocabulary Continuous Speech Recognition," Bahl L.R., et al., Jul. 1993, vol. SAP-1, No. 3, pp. 334–344.

IEEE Trans. Speech Audio Proc., "An Acoustic–Phonetic-–Based Speaker Adaption tTechnique for Improving Speaker–Independent Continuous Speech Recognition, Zhao Y., Jul. 1994, vol. SAP–2, No. 3, pp. 380–394.

IEEE Trans Speech Audio Proc., "The Metamorphic Algorithm: Speaker Mapping Approach to Data Augmentatin," Bellegarda J.R. et al, Jul. 1994, vol. SAP–2, No. 3, pp. 413–420.

EUSIPCO, PROC., "Performance of the IBM Large Vocabulary Continuous Speech Recognition System on ARPA Wall Street Journal Task," Edinburgh, Scotland, Sep. 1994.

ICASSP, Proc 1995, "Experiments Using Data Augmentation for Speaker Adaptation," Bellgarda et al., Detroit, MI, May 1995.

Primary Examiner—Tariq R. Hafiz
Attorney, Agent, or Firm—Sawyer & Associates

[57] ABSTRACT

A system and method for performing speaker adaptation in a speech recognition system which includes a set of reference models corresponding to speech data from a plurality of speakers. The speech data is represented by a plurality of acoustic models and corresponding sub-events, and each sub-event includes one or more observations of speech data. A degree of lateral tying is computed between each pair of sub-events, wherein the degree of tying indicates the degree to which a first observation in a first sub-event contributes to the remaining sub-events. When adaptation data from a new speaker becomes available, a new observation from adaptation data is assigned to one of the sub-events. Each of the sub-events is then populated with the observations contained in the assigned sub-event based on the degree of lateral tying that was computed between each pair of sub-events. The reference models corresponding to the populated sub-events are then adapted to account for speech pattern idiosyncrasies of the new speaker, thereby reducing the error rate of the speech recognition system.

30 Claims, 6 Drawing Sheets

ACOUSTIC SPACE (N dimensions)

TRAINING MODE 48

RECOGNITION MODE 55

SPEAKER ADAPTATION BASED ON LATERAL TYING FOR LARGE-VOCABULARY CONTINUOUS SPEECH RECOGNITION

FIELD OF THE INVENTION

The present invention relates to speech recognition, and more particularly to a method and system for speaker adaptation based on lateral tying for large-vocabulary continuous speech recognition.

BACKGROUND OF THE INVENTION

In large vocabulary continuous speech recognition, the task is to discriminate among acoustically similar segments of speech, called phonemes, with sufficient accuracy to recognize words. Speech recognition systems generally operate in two modes, training and recognition. In the training mode, speech recognizers are trained by statistically analyzing sets of training speech samples to develop statistical models of the samples. The models allow for variability in the way words can be pronounced. These models are subsequently used in the test mode for recognizing test speech. Presently, there are two primary types of speech recognition systems; speaker-dependent systems and speaker-independent systems.

In speaker-dependent systems, one speaker trains the system with a large sample of speech data, and once trained, the system can recognize only the speech of the training speaker. In speaker-independent systems, many speakers train the system with a small amount of speech data, and once trained, the system can generally recognize speech across a range of speakers.

Speaker-dependent systems generally achieve a lower word error rate than speaker-independent systems. This is because in speaker-dependent recognition, the statistical models developed by the system, such as acoustic prototypes and hidden Markov models (HMM) for example, can be specifically tailored to each individual speaker.

The main drawback of speaker-dependent systems, however, is that the systems typically require a very large amount of training data (e.g., several hours worth of speech) from each new speaker before he or she can utilize the recognizer profitably. In most applications, this is either extremely undesirable or altogether out of the question. Therefore, speaker-independent systems are becoming more prevalent due to the "universal" properties of their speech models.

One approach to lower the error rate of speaker-independent systems is to perform a process called speaker adaptation when the system is to recognize the speech of a new speaker. During speaker adaptation, a small amount of training data is taken from the speaker, and the training data is used to adapt or customize the set of existing speaker-independent (reference) models in the direction of the new data in order to account for speech pattern idiosyncrasies of the new speaker.

The adaptation can be done in either of two ways: block-by-block, where model customization is performed at specific intervals in time, such as after each week of use for instance, or incrementally, where the models are continuously adapted as soon as a new data, such as a sentence, is collected. The incremental approach is more desirable, since it requires less data from the new speaker, and has the potential to carry out the adjustment much more quickly. In fact, a good operational goal to aim for is to improve from speaker-independent performance to the level of typical speaker-dependent performance after only a couple of sentences.

One traditional speaker adaptation method that can be used either block-by-block or incrementally operates on reference models that are represented in a data structure called an allophonic tree. As phonetic events are extracted from adaptation data, they are assigned to one of the reference models. The reference models are then modified appropriately on the basis of this new information. The main problem is that some reference models in the tree may have little or no adaptation data assigned to them. In this case, a typically solution is to attempt to adapt these reference models by operating on some ancestor of the assigned reference models. This is done using a process called hierarchical tying, which prunes the allophonic tree to the parent to map all the observations of the children to a new acoustic event. Once this mapping of observations is calculated at the coarse level of the parent, the observations are propagated down to the children including the reference model being adapted. Thus, this method could be called the coarse approach.

The problem with hierarchical tying is that reference models are adapted based solely on their relative position with other models in the tree. This entails a loss of resolution in the speech data when the tree is pruned, and may increase the error rate of the recognition system. What is needed therefore is a speaker adaptation system and method that utilizes a different form of tying that maintains data resolution and increases recognition performance. The present invention addresses such a need.

SUMMARY OF THE INVENTION

The present invention provides a method and system for performing speaker adaptation in a speech recognition system, which includes a set of reference models corresponding to speech data from a plurality of speakers. The speech data is represented by a plurality of acoustic models and corresponding sub-events, and each sub-event includes one or more observations of speech data. The method and system comprises computing a degree of lateral tying between each pair of sub-events, where the degree of tying indicates the degree to which a first observation in a first sub-event contributes to the remaining sub-events. When adaptation data from a new speaker becomes available, a new observation from adaptation data is assigned to one of the sub-events. The method and system further comprises populating each of the sub-events with the observations contained in the assigned sub-event based on the degree of lateral tying computed between each pair of sub-events. The reference models corresponding to the populated sub-events are then adapted to account for speech pattern idiosyncrasies of the new speaker, thereby reducing the error rate of the speech recognition system.

According to the system and method disclosed herein, the present invention has resulted in a significant reduction in the error rate of the speech recognition system.

DESCRIPTION OF THE INVENTION

The present invention relates to an improvement in speech recognition systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

By analyzing acoustically similar phonemes or phone in samples of speech, it can be seen that a phone uttered in one context, is not equivalent as the same phone uttered in another context. Therefore, most speech recognitions systems generate models of allophones, which are particular sounds uttered in context, rather than models of phones. In English, there are approximately 50–54 phones, and as many as fifty allophones for each phone.

Figure 1:
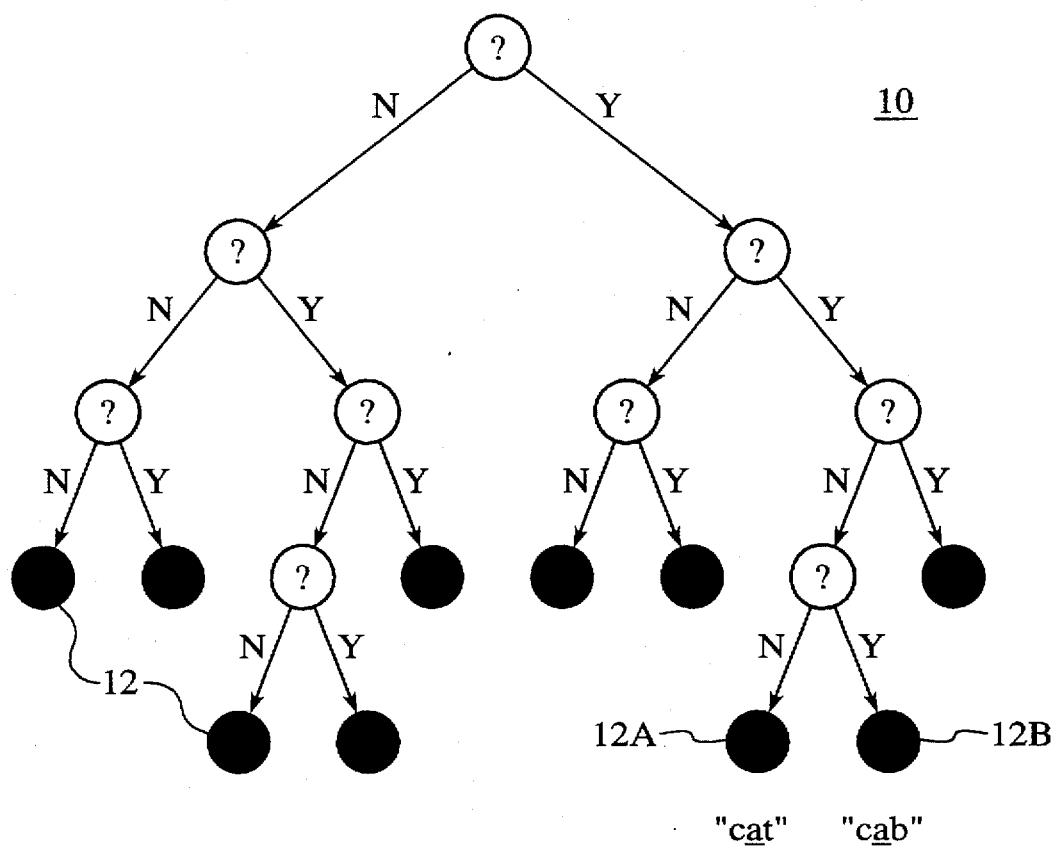
FIG. 1 is a diagram illustrating an acoustic phone represented in a conventional binary decision tree.

Referring FIG. 1 a diagram illustrating a phone represented in a conventional binary decision tree 10 is shown. The tree may be used represent a single phone or many phones. At each nonterminal node of the tree 10, there is a question relating to characteristics of a sound recorded from a user that requires a yes/no answer, and corresponding to each possible answer there is a branch leading to the next question. An example question might be "Is the sound nasal?"

The terminal nodes 12 of the tree (shown by the solid circles) represent reference models of the allophones comprising the phone. Assume for instance that the tree 10 represents the phone for the sound "AE", then that sound in context of the word "cat" is modelled in node 12A, while the sound in context of the word "cab" is modelled in node 12B.

Associated with each terminal node 12 is a reference model (not shown), which corresponds to a statistical representation of the data classified at this node. For example, the reference models may be in the form of codebooks or hidden Markov Models (HMM), for instance. Such models for the allophones are generated by first measuring a set of acoustic features from the each phonetic event found in a speech sample. Examples of features measured from a speech sample include spectrum amplitudes in a plurality of frequency bands, for instance. After measuring the feature values from a particular event, the features are formed into a mathematical vector, called a feature vector.

Figure 2:
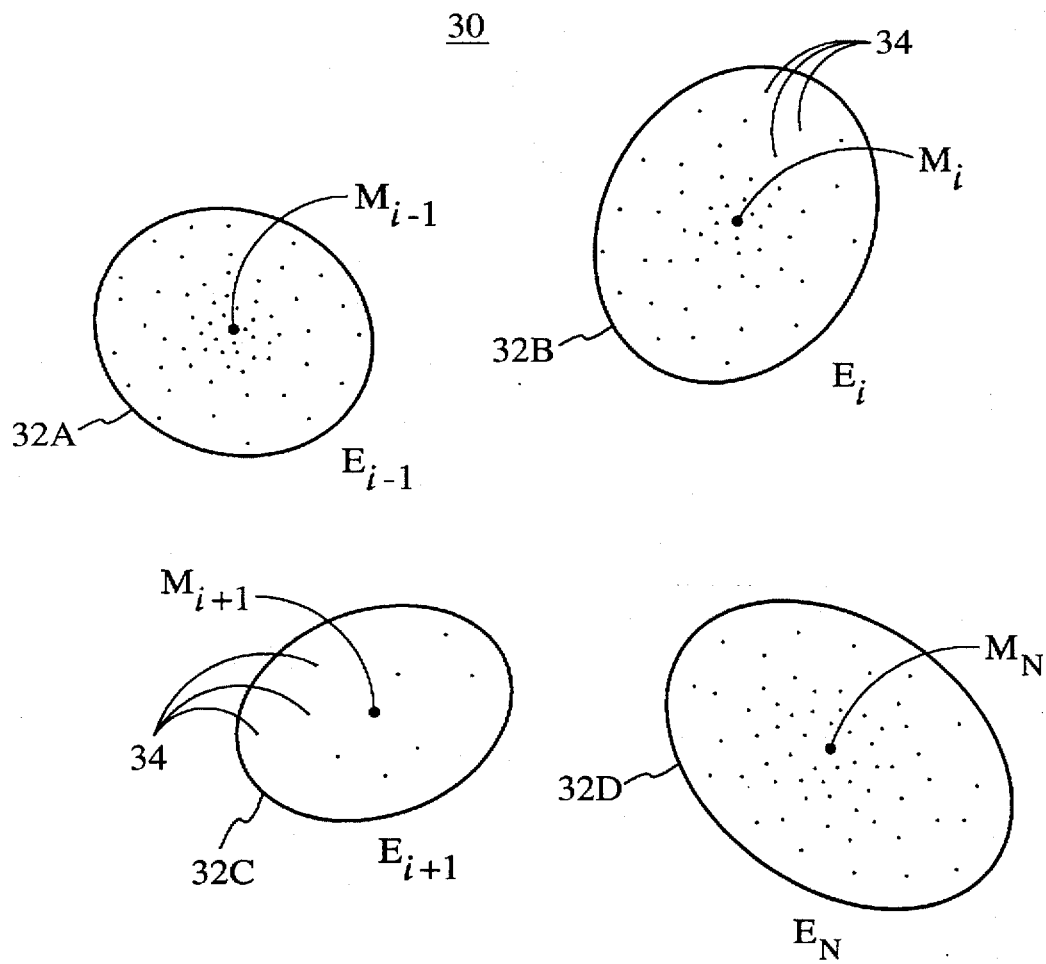
FIG. 2 depicts a portion of the acoustic space for the phone represented in the tree of FIG. 1.

FIG. 2 depicts a portion of the acoustic space 30 for the phone represented in the tree of FIG. 1. The feature vectors 34 occupy territory in an N-dimensional acoustic space 30, where the number of dimensions corresponds to the number of features extracted from the phonetic events. In a preferred embodiment, thirty-nine different features are extracted from a phonetic event, creating feature vectors that have thirty-nine values. Therefore, the acoustic space 30 in which the feature vectors exist has thirty-nine dimensions.

The distribution of the feature vectors 34 created from each allophone defines what is referred to as a sub-event (E) 32 in the acoustic space 30. Each sub-event 32 is populated with any number of feature vectors 34 depending on how many occurrences of the corresponding allophone was observed in the training data. Each of the sub-events 32 is used to create the statistical reference model for the corresponding allophone. Since the feature vectors comprising a sub-event 32 are generated from the speech of many speakers during training, the models are called speaker-independent reference models.

During speaker adaptation, which is performed during recognition mode, a small amount of adaptation data is provided by a new speaker before the systems attempts to recognize speech. As the adaptation data is analyzed, new feature vectors 34 are generated and mapped to appropriate sub-events 32, and then used to adapt or update the set of existing speaker-independent models in the tree in order to account for the speech pattern idiosyncrasies of the new speaker.

Since a new speaker provides only a few sentences during training, only a fraction of the sub-events will ever appear in the available adaptation data. For example, referring again to FIG. 1, the adaptation data may include data for the allophone "AE" in the context of the word "cat", but not in the context of the word "cab". Many sub-events in the adaptation data will therefore be sparsely, or not at all, populated with feature vectors 34.

Before a reference model representing a particular allophone can be updated by the speaker adaptation process, the corresponding sub-event 12 must possess a minimum level of granularity. This means that the corresponding sub-event 12 must be populated with a sufficient number of observations from adaptation data, where the term observation refers to a representation of a phonetic event extracted from speech data. In a preferred embodiment, a phonetic event is represented by a set of feature vectors.

The problem is determining how to update all possible acoustic sub-events from adaptation data, when, because of a lack of observations in the adaptation data, it cannot be determined which ones may be subject to idiosyncratic speech patterns of the new speaker.

Broadly speaking, the underlying strategy is to find an appropriate mapping between the new speaker's sub-events and the existing speaker-independent sub-events. The idea is to use this speaker-normalizing mapping to transform the previously acquired parameters of the training speakers onto the space of the adaptation data acquired from the new speaker, or the other way around.

Figure 3:
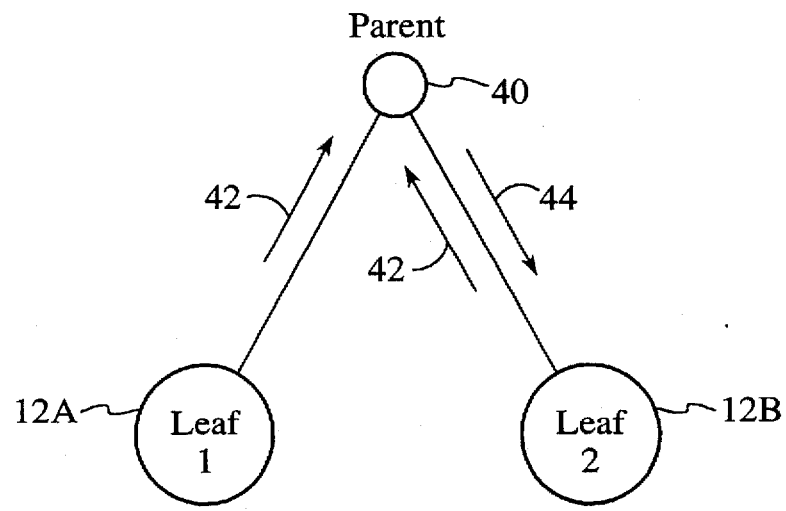
FIG. 3 is a block diagram of a portion of the allophonic tree that is occupied by a parent and two leaves.

A typical solution to the speaker adaptation problem is referred to as the coarse approach. The coarse approach uses hierarchical tying to manipulate the hierarchal parent/child relationships in the allophonic tree in order to increase the granularity of the sub-events until they are suitably populated, as shown in FIG. 3. FIG. 3 is a block diagram of a portion of the allophonic tree 10 that is occupied by a parent 40 and two leaves 12A and 12B. For purposes of example, assume that the sub-event corresponding to leaf 12A is well populated with observations from adaptation data, and that sub-event corresponding to leaf 12B is sparsely populated. The coarse approach attempts to increase the granularity of the sub-event representing leaf 12B using the data in leaf 12A until the sub-event corresponding to leaf 12B is populated with enough observations so that the reference model representing leaf 12B can be updated. This is done by pruning the allophonic tree to the parent 40, shown by arrow 42, to reduce the level of detail in the acoustic representation, and to increase the number of observations falling within a newly created acoustic event, which was formerly represented by the two separate events in leaves 12A and 12B. Once this mapping of observations is calculated at the coarse level of the parent, the observations are propagated down to the more detailed representation of leaf 12B, shown by arrow 44.

The coarse approach is shown in FIG. 3 operating on a direct relationship between a parent 40 and two leaves 12A and 12B. However, the coarse approach may also be used in a relationship between a parent and two branches of the tree, in which case observations from many leaves in a first branch would be used to populate leaves in a second branch.

The drawback to the coarse approach is that there is no guarantee that, for a given coarse acoustic event, the (single) mapping thus calculated will be equally adequate for all the associated detailed acoustic sub-events comprising the coarse event. The following example illustrates the point.

Suppose that adaptation data for a given speaker includes a coarse event C, and that the speaker typically exhibits some idiosyncratic behavior for an acoustic sub-event E, which belongs within the coarse event C. Assume first that for whatever reason E was not represented at all in the adaptation data. In this case, the adaptation process would fail to capture the speaker's idiosyncratic behavior. Assume next that for whatever reason E was severely over-represented in the adaptation data. Then in this case, the adaptation process might actually corrupt all the other acoustic sub-events comprising C.

The problem with the coarse approach, which utilizes hierarchical tying as exemplified above, is that sub-events 32 are tied with other sub-events 32 based solely on the relative position of the sub-events 32 in the tree 10. This entails a loss of resolution when the tree 10 is pruned.

The present invention introduces the concept of lateral tying between acoustic sub-events in which each sub-event 32 exhibits some degree of tying with all other sub-events 32, regardless of their relative position an the allophonic tree. In contrast to hierarchical tying, lateral tying maintains the same granularity for all the sub-events 32.

Figure 4:
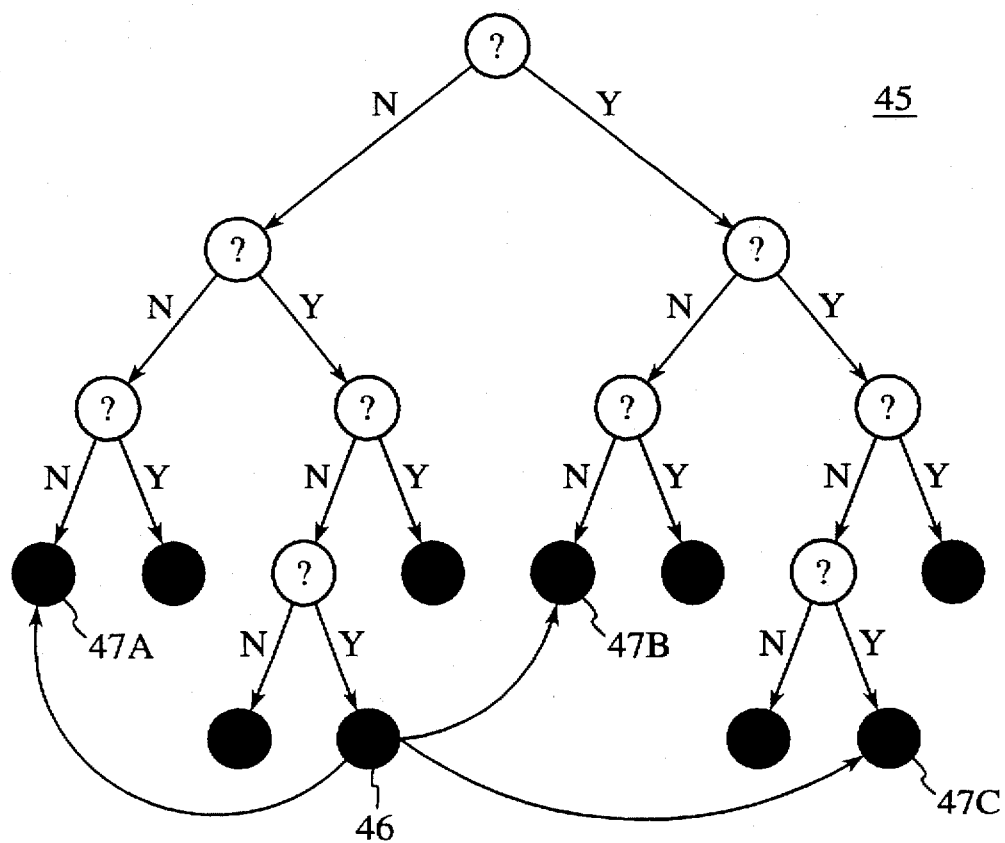
FIG. 4 is a diagram graphically illustrating speaker adaptation with lateral tying performed on an allophonic tree in accordance with the present invention.

FIG. 4 is a diagram graphically illustrating speaker adaptation with lateral tying performed on an allophonic tree 45 in accordance with the present invention. In this example, an observation from adaptation data has been associated with a sub-event corresponding to leaf 46 in the tree 45. With lateral tying, the sub-event corresponding to leaf 46 can potentially contribute to all other sub-events, to the extent indicated by their respective degree of tying. In this example, sub-event corresponding to leaf 46 is shown contributing to sub-events corresponding to leaves 47A, 47B, and 47C, which are located in different branches of the allophonic tree 45 and on different levels. This new framework can lead to an efficient way of populating sub-events 32, while retaining the capability of adjusting to specific idiosyncratic behaviors.

Figure 5:
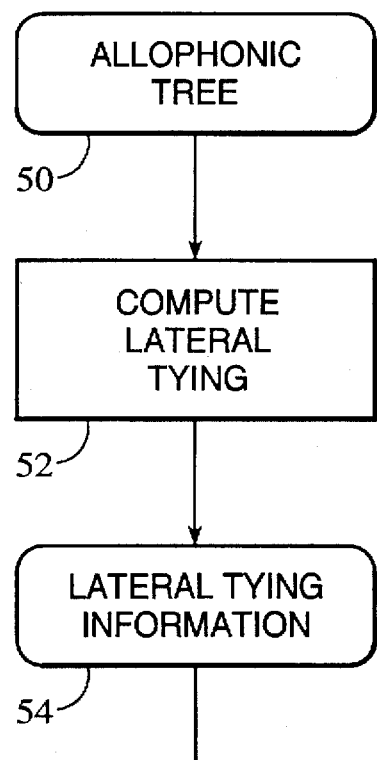
FIG. 5 is a flow chart showing the process of speaker adaptation using lateral tying in accordance with the present invention.
Figure 5:
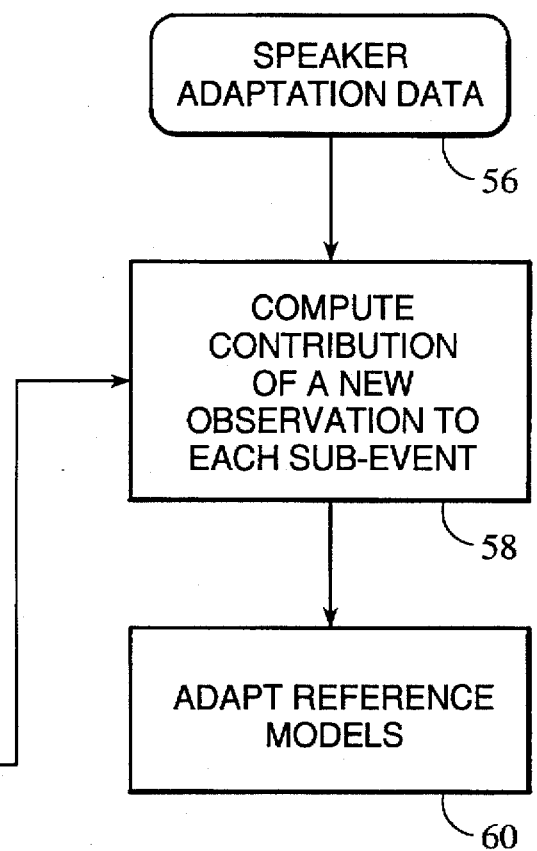

Referring now to FIG. 5, the process of speaker adaptation using lateral tying in accordance with the present invention is shown performed in two stages. During training mode 48, input to the system is one or more previously generated allophonic trees 50 that represent a large quantity of diverse training data. Given the allophonic tree 50, the present invention first computes the appropriate degree of lateral tying between each pair of acoustic sub-events 32 in the tree 50 in step 52. The output of the training process is lateral tying information 54, which represents the degree of lateral tying computed between each pair of sub-events 32. Typically, the degree of tying can be expected to depend on the language involved (e.g., English).

During recognition mode 55, the input to the system is speaker adaptation data 56 that is spoken by a new user of the system. As the adaptation data becomes available, the data is transformed into a string of observations. In step 58, the contribution of each new observation of adaptation data 56 to the relevant acoustic sub-events 32 is computed based on the lateral tying information 54. Based on this computed contribution in step 58, the appropriate reference models are adapted accordingly in step 60. Note that this stage does not involve any large quantity of reference data, thus enabling fast incremental adaptation. This directly results from the decoupling of the procedure into two separate stages.

Figure 6:
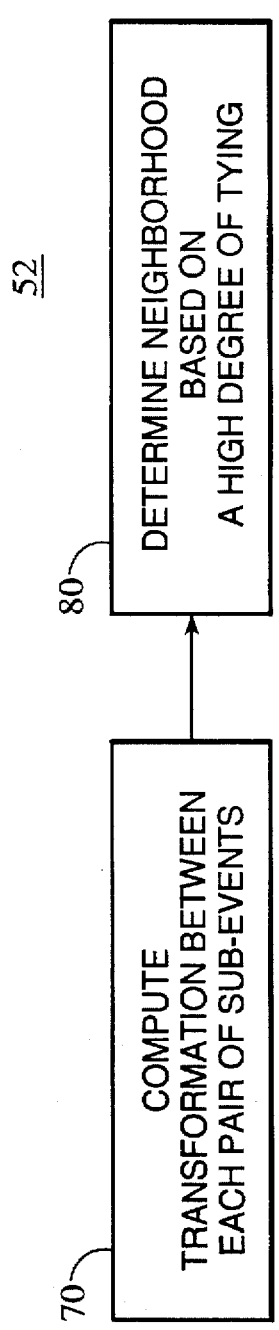
FIG. 6 is a diagram illustrating an overview of the steps performed during the process of computing the degree of lateral tying.

Referring now to FIG. 6, an overview of the steps performed during the process of computing the degree of lateral tying 52 is shown. Referring to both FIGS. 2 and 6, the process 52 of computing the degree of lateral tying is performed for each pair of sub-events 32 existing in the acoustic space 30, and is basically a determination of how the feature vectors 34 in two respective sub-events 32 are correlated to each other.

First, a transformation is computed for each pair of sub-events 32 in step 70, which is used to indicate if a high degree of lateral tying exist between the pair, as explained further below. After a series of transformations are computed for all pairs of sub-events 32, a neighborhood of sub-events 32 that exhibit a high degree of lateral tying with each respective sub-event 32 is identified in step 72.

Referring to both FIGS. 2 and 5, when a new observation of adaptation data 56 becomes available during recognition mode 55, the new observation is associated with a particular sub-event 32. The neighborhoods of sub-events 32 computed in step 80 are then used to compute the contribution of the new observation to every other sub-event 32 in step 58.

Figure 7:
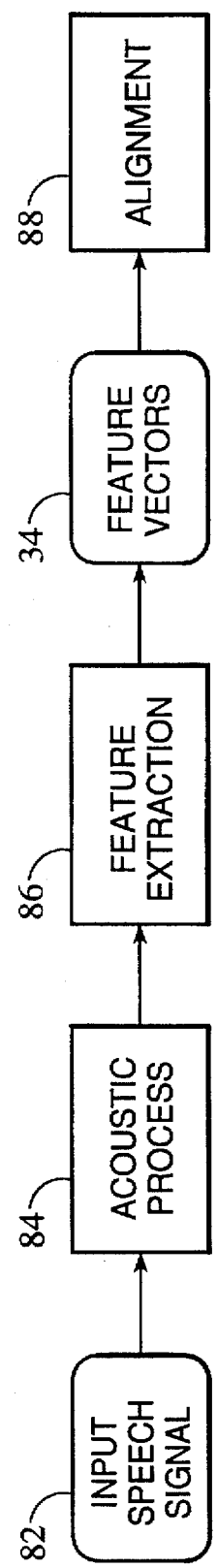
FIG. 7 is a block diagram illustrating how speaker adaptation data is processed during recognition mode.

FIG. 7 is a block diagram illustrating how speaker adaptation data 56 is processed during recognition mode 55. Speech from a new user spoken in a few sentences is acquired during recognition mode in the form of input speech signals 82. The speech signals 82 are then input into an acoustic process 84, which transforms the input speech signal 82 into some type of physical representation of the signal's properties. Many types of acoustic processes 84 are well-known in the art. One example is to perform a short-term fourier transform on the speech signal to produce a spectral domain representation, followed by a magnitude operation, for example.

After the acoustic process 84 transforms the speech signal 82 into a physical representation, feature extraction 86 is performed in order to extract certain acoustic features from the speech signal, and to group the features into a feature vector. Since a feature vector is generated for each phonetic event observed in the speech signal 82, the output of feature extraction process 86 is a series of feature vectors 34.

An alignment process 88 is then used to align the series of feature vectors 34 to the allophones sampled during training. Referring to both FIGS. 2 and 7, the alignment process 88 is performed by comparing the feature vectors 34 with the sub-events 32 comprising the allophonic trees in order to specify which feature vectors 34 belong to which sub-events 32.

Referring again to FIG. 2, after the feature vectors corresponding to new occurrences of adaptation data have been aligned, statistics are generated for each acoustic sub-event 32 as follows: Let $E_i$, where $i=1, 2, \ldots$, represent a sub-event in the acoustic space 30. Then as used below, $c_i$ denotes the count of each feature vector 34 observed in the sub-event $E_i$; $M_i$ denotes the mean feature vector 34; and the distribution of the feature vectors 34 about the mean is represented by a covariance matrix $S_i$. These statistics are used to compute transformations (step 70) between each pair of sub-event 32 in the acoustic space 30 in order to determine the degree of lateral tying between each pair.

Figures 8, 9:
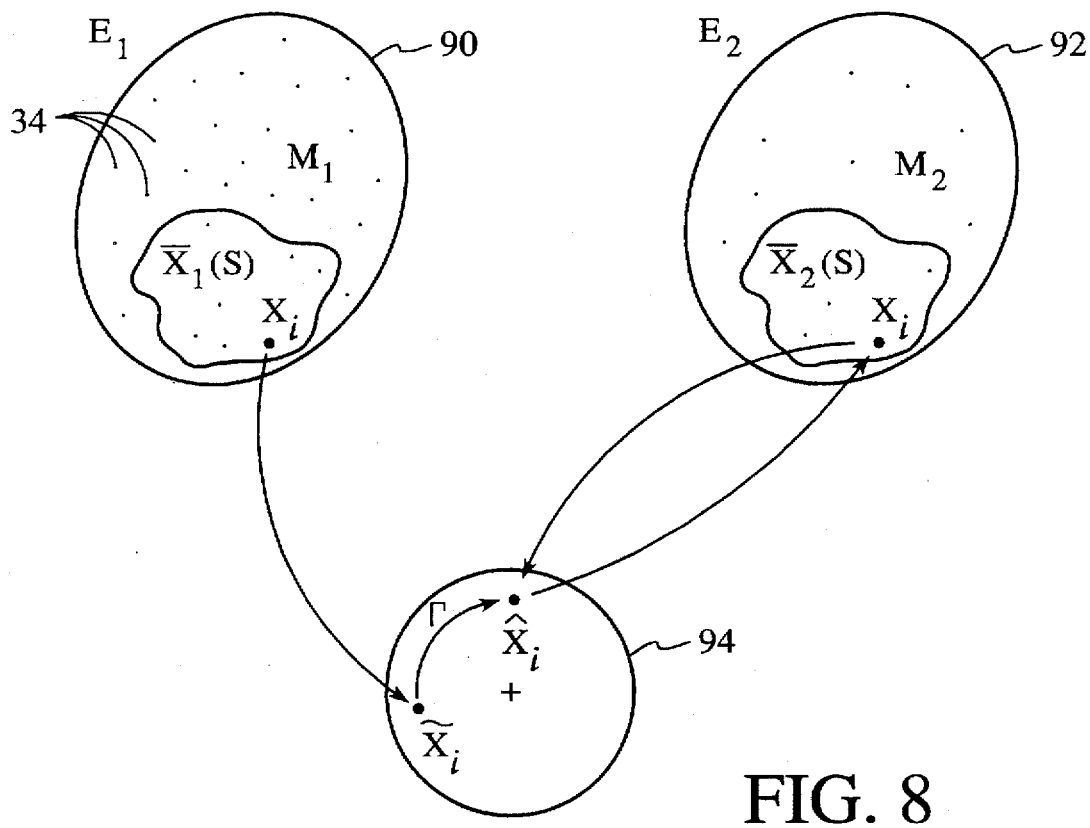
FIG. 8 is a diagram graphically illustrating the calculation of a transformation between two sub-events.
FIG. 9 is a diagram graphically illustrating the process of determining neighborhoods of laterally tied sub-events.

FIG. 8 is a diagram graphically illustrating the calculation of a transformation between two sub-events 90 and 92. Recall that given a first sub-event 90 that is well populated with feature vectors 34, and second sub-event 92 that is sparsely populated with feature vectors 34, the goal of speaker adaptation using lateral tying is to utilize the observed feature vectors 34 in sub-event 90 in order to obtain an estimate of the unobserved feature vectors in the sub-event 92. This is accomplished by transforming the feature vectors 34 in the sub-event 90 into the space of the sub-event 92 in order to populate the sub-event 92.

As shown in FIG. 8, the feature vectors 34 in the sub-event 90 are transformed into the space of the sub-event 92 through the use of a unit sphere 94, which is a space centered at (0,0). First, each feature vector $X_i$, $i=1,2$, in sub-event 90 is transformed into a corresponding vector $\bar{X}_i$ in the unit sphere by:

$$\bar{X}_i = S_i^{-1/2}(X_i - M_i) \quad (1)$$

so that the vectors $\bar{X}_i$ have a mean vector of zero and a covariance matrix I, which represents an identity matrix:

$$\begin{bmatrix} 1 & 0 & 0 & 0 & - \\ 0 & 1 & 0 & 0 & - \\ 0 & 0 & 1 & 0 & - \\ 0 & 0 & 0 & 1 & - \\ - & - & - & - & - \end{bmatrix}$$

Similarly, the feature vectors 34 in the sub-event 92 are transformed into a corresponding vector $\hat{X}_i$ in the unit sphere 94. Thus, the unit sphere 94 will contain feature vectors from both sub-event spaces 90 and 92 that will have to be related to one another. Figuratively speaking, the process must find a transformation that when applied to a point $\bar{X}_i$ in the unit sphere 94, will rotate the point to a new point $\hat{X}_i$ that is appropriate for the space of the sub-event 92 in a least squared sense. This transformation is denoted by $\Gamma$.

Continuing with this process, the inverse square root of the covariance matrix can be obtained as:

$$S^{-1/2} = Q\Delta^{-1/2}Q^T \quad (2)$$

where Q is the eigenvector matrix of the covariance matrix S, $\Delta$ is the diagonal matrix of corresponding eigenvalues, and T denotes transposition. Moreover, to ensure that the covariance matrices are full rank, if either $c_1$ or $c_2$ is less than some pre-specified threshold, both covariance matrices are reduced to diagonal matrices, or, if necessary, to the identity matrix.

Recall that each sub-event comprising the training data contains feature vectors 34 taken from the speech many speakers. If the same speaker has produced data in both sub-events 90 and 92, for example, then it is known those feature vectors 34 are in correspondence. Therefore, to help determine $\Gamma$, each feature vector 34 in the training set of sub-events is first segregated according to which speaker it originated from (assuming, of course, a speaker-independent training).

Once this is done, for each sub-event $E_i$, $i=1, 2, \ldots$, and for each speaker s, the number $c_i(s)$ of normalized feature vectors available is computed, as well as their centroid $\bar{X}_i(s)$. This centroid is called an anchor point, to express the fact that it represents a particular (speaker-dependent) acoustic sub-event within $E_i$. Thus, for each speaker s, a pair of matched anchor points $\bar{X}_1(s)$, $\bar{X}_2(s)$ is obtained in two respective sub-events, as shown in FIG. 8.

The degree of tying between two sub-events $E_1$ and $E_2$ is based on the (normalized) cross-covariance matrix between $E_1$ and $E_2$, which, taking the above into account, can be defined as:

$$K_{12} = \sum_s \omega_s \bar{X}_2(s)\bar{X}_1(s)^T \quad (3)$$

where the summation is over either all the speakers in the training pool, or some held-out speakers set aside for this purpose. The role of the coefficients $\omega_s$ is to give more weight to frequent acoustic sub-events over infrequent ones, thus yielding a more realistic correlation measure.

One of many possible formulations for these weighting coefficients is given by:

$$\omega_s = \frac{c_1(s)c_2(s)}{c_1(s) + c_2(s)} \quad (4)$$

which, for a given value of $c_1(s)$ is maximized along the line $c_2(s) = c_1(s)$.

The expression yielding $K_{12}$ above is a relative measure of how the two acoustic sub-events $E_1$ and $E_2$ are correlated with each other, as accumulated on a speaker-by-speaker basis. It is therefore adequate for the purpose of lateral tying. For reasons to become clear shortly, it is convenient to compute the Singular Value Decomposition of $K_{12}$, which yields the following representation:

$$K_{12} = U_{12}\Psi_{12}V_{12}^T \quad (5)$$

where $\Psi_{12}$ is the diagonal matrix containing the singular values (listed in decreasing order) and $U_{12}$ and $V_{12}$ are both unitary (i.e., eigen matrixes of left singular vectors and right singular vectors).

This allows the computation of the quantity:

$$\Gamma_{12} = U_{12}V_{12}^T \quad (6)$$

which, referring again to FIG. 8, can be shown to represent the least squares rotation that must be applied (in the unit sphere 94) to $\bar{X}_1(s)$ in sub-event 90 to obtain an estimate of $\bar{X}_2(s)$ in sub-event 92.

The degree of tying between $E_1$ and $E_2$ is the highest if for all speakers s, the two anchor points $\bar{X}_1(s)$ and $\bar{X}_2(s)$ fall within the same location in the unit sphere 94. In this case no transformation is needed to rotate the points, so $\Gamma$ becomes an identity matrix. The highest possible degree of tying is achieved when $\Gamma$ is the identity matrix, and when this occurs, the least square error in the rotation estimation is zero.

On the other hand, if the least square error in the rotation estimation is large, substantial rotation is necessary to rotate anchor point $X_1(s)$ to $X_2(s)$. In this case, then the two sub-events are not tightly correlated, and so the degree of tying is small.

Referring again to FIG. 6, a transformation matrix $\Gamma$ is computed in step 70 for every pair of acoustic sub-events 34. If the size of the sub-event inventory is L, then the procedure results in a total of $L(L-1)$ $\Gamma$ matrices. Clearly, for a given acoustic sub-event not all $(L-1)$ matrices $\Gamma_{ij}$, $j \neq i$, are equally relevant. Only those close to the identity matrix correspond to significantly correlated sub-events (i.e., those for which $X_i(s) \approx X_j(s)$).

According to the present invention, a neighborhood is created for each $E_i$ that includes only those sub-events 34 most closely correlated with $E_i$ by discarding the $\Gamma$ matrices that represent non-significantly correlated sub-events. This results in a neighborhood for $E_i$ that has a size less than $(L-1)$.

In a preferred embodiment of the present invention, the closeness of each $\Gamma$ to the identity matrix, which may then be used to determine a neighborhood $N_i$, is quantified using a Frobenius distance measure. For each matrix $\Gamma$, the following quantity is defined:

$$D(\Gamma_{ij}) = \|I - \Gamma_{ij}\|^2 \qquad (7)$$

where I represents the identity matrix. As the distance, D, increases, the degree of lateral tying decreases.

In order to normalize contributions properly within the neighborhood, the following scalar is computed for each $E_j$ in the sub-event inventory:

$$\lambda_j = 1 - \frac{D(\Gamma_{ij})}{\max_j D(\Gamma_{ij})} \qquad (8)$$

so that full weight is given to that acoustic sub-event most closely correlated with $E_i$. The value of $\lambda_j$ ranges from one to zero, where a value of one represents the maximum degree of tying, and a value of zero represents the minimum degree of tying.

FIG. 9 is a diagram graphically illustrating the process of determining a neighborhood for each sub-event based on a high degree tying (step 80). The neighborhood for sub-event $E_i$ is denoted by $N_i$, and comprises other sub-events $E_j, j=1, 2, \ldots$, that are most closely correlated with $E_i$.

After all the values of $\lambda_j$ are computed between sub-event $E_i$ and all other sub-events $E_j$, the neighborhood $N_i$ is created. This may be done using two alternative approaches. In one approach, the neighborhood $N_i$ may be constructed by examining the measure of $D(\Gamma_{ij})$, $\lambda_j$, and excluding those sub-events $E_j$ from the $N_i$ whose value of $\lambda_j$ deviates from the maximum value of $\lambda$ by more than a pre-determined percentile, such as fifty percent, for instance. This approach may result in neighborhoods that have a different number of members for each allophone.

If neighborhoods having the same number of members is desired for each allophone, as in the preferred embodiment of the present invention, a second approach may be used. In this approach, each neighborhood $N_i$ is created by ranking each pair of sub-events $(E_i, E_j)$ from the highest value of $\lambda_j$ to the lowest, and by including in the neighborhood only a predetermined number of sub-events $E_j$ that have the highest ranked values of $\lambda_j$. This results in each neighborhood $N_i$ having a uniform number of members. In a preferred embodiment, each neighborhood $N_i$ is limited to ten members.

Referring again to FIG. 5, after the training mode 48 in which a neighborhood for each sub-event is determined (step 80), during recognition mode 55 the contribution of a new observation from the adaptation data 56 to each member of the neighborhood is computed (step 58). This is essentially a data augmentation problem, where an artificial data point needs to be synthesized for each of the sparsely populated sub-events based on (i) the lateral tying calculated during training and (ii) the feature vector created from the new observation.

Let $Z_i$ denote a new feature vector from the adaptation data 56 assigned to the sub-event $E_i$, and $N_i$ represents the neighborhood of $E_i$, as obtained above. The new feature vector is first projected into the unit sphere 94 by:

$$\tilde{Z}_i = S_i^{-1/2}(Z_i - M_i) \qquad (9)$$

as prescribed in equation (1).

Then, for each acoustic sub-event $E_j$ in the neighborhood $N_i$ of $E_i$, a unit sphere vector 94 corresponding to the $E_j$ is synthesized from $Z_i$. This is given by:

$$\tilde{Z}_j = \Gamma_{ij} \tilde{Z}_i \qquad (10)$$

However, this contribution should be weighted appropriately according to the relative importance of sub-event $E_j$ in the neighborhood $N_i$. Thus, equation (8) is taken into account in (10) to give:

$$\tilde{Z}_j = \lambda_j \Gamma_{ij} \tilde{Z}_i \qquad (11)$$

which gives an estimate of the contribution of $Z_i$ to the sub-event $E_j$ based on the lateral tying framework.

It remains to restore the resulting contribution at the appropriate place in the acoustic space of $E_j$ by reversing the transformation of equation (1):

$$\hat{Z}_j = S_j^{-1/2} \tilde{Z}_j + M_j \qquad (12)$$

Combining the three steps shown in equations (9) through (12), the overall expression can be written as:

$$\hat{Z}_j = (S_j^{1/2} \lambda_j \Gamma_{ij} S_i^{-1/2}) Z_i + (M_j - S_j^{1/2} \lambda_j \Gamma_{ij} S_i^{-1/2} M_i) \qquad (13)$$

This expression reflects how to utilize an observed feature vector $Z_i$ from the adaptation data 56 that was assigned to sub-event $E_i$ to obtain an estimate of an unobserved feature vector $\hat{Z}_j$ in sub-event $E_j$ contained in $N_i$.

Referring again to FIG. 5, after the contribution of observed feature vectors from the adaptation data have been computed in step 58, the reference models corresponding to each sub-event $E_j$ in $N_i$ are updated accordingly in step 60. As soon each sub-event $E_j$ in $N_i$ gathers some data, original or through the transformation in equation (13) the following parameters for sub-event $E_i$, $c_i$, $M_i$, and $S_i$, are modified in the following fashion:

$$\hat{C}_i = C_i + 1,$$

$$\hat{M}_i = \frac{Z_i + C_i M_i}{\hat{C}_i},$$

$$\hat{S}_i = \frac{\|Z_i\|^2 + C_i(S_i + \|M_i\|^2)}{\hat{C}_i} - \|\hat{M}_i\|^2.$$

A weighting factor may also be used to give more or less weight to the new information, if desired. Of course, the reference model update does not have to be done after each new observation. In a preferred embodiment, it considered sufficient to update the reference models once after each sentence of adaptation data 56.

During tests, the present invention has resulted in a 19% reduction in the recognition error rate across twelve test speakers, compared to a standard baseline large vocabulary speaker-independent system. This compares favorably with the current state-of-the-art reduction achieved by existing speaker adaptation procedures on native speakers (16%). In addition, the present approach has the advantage of degrading gracefully as the number of adaptation sentences decreases. This is a direct benefit of the data augmentation paradigm, which bypasses the asymptotic assumptions of standard Bayesian techniques.

A method for performing speaker adaptation based on lateral tying has been disclosed. Software written according to the present invention is intended to reside in some form of computer readable medium, such as memory or disk or communicated via a network. The software is not intended to be limited to any type of specific computer hardware platform, although as with most programs, performance may be enhanced with faster hardware processors and increased memory.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of performing speaker adaptation in a speech recognition system which includes a set of reference models corresponding to speech data from a plurality of speakers, the speech data represented by a plurality of acoustic models and corresponding sub-events, wherein each sub-event includes one or more observations of speech data, the method comprising the steps of:
   (a) computing a degree of lateral tying between each pair of sub-events, wherein the degree of tying indicates the degree to which a first observation in a first sub-event contributes to the remaining sub-events;
   (b) assigning a new observation from adaptation data of a new speaker to one of the sub-events;
   (c) populating each of the sub-events with a transformed version of the observation contained in the assigned sub-event based on the degree of lateral tying computed between each pair of sub-events;
   (d) adapting the reference models that correspond to the populated sub-events to account for speech pattern idiosyncrasies of the new speaker, thereby reducing the error rate of the speech recognition system.

2. A method as in claim 1 wherein step (a) further includes the step of:
   (a1) computing a transformation for each pair of sub-events to indicate if a high degree of lateral tying exist between the pair.

3. A method as in claim 2 wherein step (a) further includes the step of:
   (a2) for each of the sub-events, identifying a neighborhood of other sub-events that exhibit a high degree of tying with the respective sub-event.

4. A method as in claim 3 wherein step (c) further includes the step of:
   (c1) populating only those sub-events that are included in the neighborhood of the assigned sub-event.

5. A method as in claim 4 wherein step (a1) further includes the steps of:
   (a1i) representing observations by feature vectors;
   (a1ii) segregating each feature vector in the sub-events according to which speaker the feature vector originated from;
   (a1iii) for each speaker s, determining an anchor point of the feature vectors in each of the sub-events i, given by $\bar{X}_i(s)$;
   (a1iv) defining the degree of tying between sub-events $E_1$ and $E_2$ is based on a cross-covariance matrix between $E_1$ and $E_2$ by $$K_{12} = \sum_s \omega_s \bar{X}_2(s)\bar{X}_1(s)^T$$

where the summation is over all the speakers; and
   (a1v) computing a transformation matrix for every pair of sub-events using the quantity $$\Gamma_{12} = U_{12}V_{12}^T \qquad (6)$$

to represent the least squares rotation that must be applied to $X_1(s)$ in sub-event $E_1$ in order to obtain an estimate of $X_2(s)$ in sub-event $E_2$.

6. A method as in claim 5 wherein step (a2) further includes the step of:
   (a2i) determining which sub-events $E_j$ are closely correlated with $E_i$ by a distance measure $$D(\Gamma_{ij}) = \|I - \Gamma_{ij}\|^2$$

and $$\lambda_j = 1 - \frac{D(\Gamma_{ij})}{\max_j D(\Gamma_{ij})}$$

which is computed for each $E_j$, and wherein $\lambda_j$ has a value that ranges from one to zero, where a value of one represents a maximum degree of tying.

7. A method as in claim 6 wherein step (a2) further includes the step of:
   (a2ii) creating a neighborhood for sub-event $E_i$ by excluding those sub-events $E_j$ from the neighborhood whose value of $\lambda_j$ deviates from the maximum value of $\lambda$ by more than a pre-determined percentile.

8. A method as in claim 6 wherein step (a2) further includes the step of:
   (a2iii) creating a neighborhood for sub-event $E_i$ by ranking each $E_j$ from the highest value of $\lambda_j$ to the lowest, and by including in the neighborhood only a predetermined number of sub-events $E_j$ that have the highest ranked values of $\lambda_j$.

9. A method as in claim 8 wherein step (c1) further includes the step of:
   (c1i) calculating $$\hat{Z}_j = (S_j^{1/2}\lambda_j\Gamma_{ij}S_i^{-1/2})Z_i + (M_j - s_j^{1/2}\lambda_j\Gamma_{ij}S_i^{-1/2}M_i)$$

wherein $Z_i$ denotes a first feature vector from the adaptation data assigned to sub-event $E_i$, which is used to obtain an estimate of an unobserved feature vector $\hat{Z}_j$ in sub-event $E_j$ that is contained in neighborhood of sub-event $E_i$.

10. A speech recognition system that performs speaker adaptation, the system including a set of reference models corresponding to speech data from a plurality of speakers, the speech data represented by a plurality of acoustic models and corresponding sub-events, wherein each sub-event includes one or more observations of speech data, the speech recognition system comprising:
    (a) means for computing a degree of lateral tying between each pair of sub-events, wherein the degree of tying indicates the degree to which a first observation in a first sub-event contributes to the remaining sub-events;

(b) means for assigning a new observation from adaptation data of a new speaker to one of the sub-events;

(c) means for populating each of the sub-events with a transformed version of the observation contained in the assigned sub-event based on the degree of lateral tying computed between each pair of sub-events;

(d) means for adapting the reference models that correspond to the populated sub-events to account for speech pattern idiosyncrasies of the new speaker, thereby reducing the error rate of the speech recognition system.

11. A system as in claim 10 wherein the means for computing computes a transformation for each pair of sub-events to indicate if a high degree of lateral tying exist between the pair.

12. A system as in claim 11 wherein the means for computing further includes means for identifying a neighborhood for each of the sub-events that represents other sub-events that exhibit a high degree of tying with the respective sub-event.

13. A system as in claim 12 wherein the means for populating only populates those sub-events that are included in the neighborhood of the assigned sub-event.

14. A system as in claim 13 wherein the means for computing further includes:

means for representing observations by feature vectors;

means for segregating each feature vector in the sub-events according to which speaker the feature vector originated from;

means for determining for each speaker s, an anchor point of the feature vectors in each of the sub-events i, given by $X_i(s)$;

means for defining the degree of tying between sub-events $E_1$ and $E_2$ is based on a cross-covariance matrix between $E_1$ and $E_2$ by $$K_{12} = \sum_s \omega_s \bar{X}_2(s) \bar{X}_1(s)^T$$

where the summation is over all the speakers; and (a1v) means for computing a transformation matrix for every pair of sub-events using the quantity $$\Gamma_{12} = U_{12} V_{12}^T \qquad (6)$$

to represent the least squares rotation that must be applied to $X_1(s)$ in sub-event $E_1$ in order to obtain an estimate of $X_2(s)$ in sub-event $E_2$.

15. A system as in claim 14 wherein means for computing further includes means for determining which sub-events $E_j$ are closely correlated with $E_i$ by a distance measure $$D(\Gamma_{ij}) = \|I - \Gamma_{ij}\|^2$$

and $$\lambda_j = 1 - \frac{D(\Gamma_{ij})}{\max_j D(\Gamma_{ij})}$$

which is computed for each $E_j$, and wherein $\lambda_j$ has a value that ranges from one to zero, where a value of one represents a maximum degree of tying.

16. A system as in claim 15 wherein the means for computing creates a neighborhood for sub-event $E_i$ by excluding those sub-events $E_j$ from the neighborhood whose value of $\lambda_j$ deviates from the maximum value of $\lambda$ by more than a pre-determined percentile.

17. A system as in claim 16 wherein the means for computing creates a neighborhood for sub-event $E_i$ by ranking each $E_j$ from the highest value of $\lambda_j$ to the lowest, and by including in the neighborhood only a predetermined number of sub-events $E_j$ that have the highest ranked values of $\lambda_j$.

18. A system as in claim 17 wherein the means for populating includes means for calculating $$\hat{Z}_j = (S_j^{1/2} \lambda_{ij} \Gamma_{ij} S_i^{-1/2}) Z_i + (M_j - S_j^{1/2} \lambda_{ij} \Gamma_{ij} S_i^{-1/2} M_i)$$

wherein $Z_i$ denotes a first feature vector from the adaptation data assigned to sub-event $E_i$, which is used to obtain an estimate of an unobserved feature vector $\hat{Z}_j$ in sub-event $E_j$ that is contained in neighborhood of sub-event $E_i$.

19. A computer-readable medium containing program instructions for performing speaker adaptation in a speech recognition system which includes a set of reference models corresponding to speech data from a plurality of speakers, the speech data represented by a plurality of acoustic models and corresponding sub-events, wherein each sub-event includes one or more observations of speech data, the program instructions for:

(a) computing a degree of lateral tying between each pair of sub-events, wherein the degree of tying indicates the degree to which a first observation in a first sub-event contributes to the remaining sub-events;

(b) assigning a new observation from adaptation data of a new speaker to one of the sub-events;

(c) populating each of the sub-events with a transformed version of the observation contained in the assigned sub-event based on the degree of lateral tying computed between each pair of sub-events;

(d) adapting the reference models that correspond to the populated sub-events to account for speech pattern idiosyncrasies of the new speaker, thereby reducing the error rate of the speech recognition system.

20. A computer-readable medium as in claim 1 wherein instruction (a) further includes the instruction of:

(a1) computing a transformation for each pair of sub-events to indicate if a high degree of lateral tying exist between the pair.

21. A computer-readable medium as in claim 2 wherein instruction (a) further includes the instruction of:

(a2) for each of the sub-events, identifying a neighborhood of other sub-events that exhibit a high degree of tying with the respective sub-event.

22. A computer-readable medium as in claim 3 wherein instruction (c) further includes the instruction of:

(c1) populating only those sub-events that are included in the neighborhood of the assigned sub-event.

23. A computer-readable medium as in claim 4 wherein instruction (a1) further includes the instructions of:

(a1i) representing observations by feature vectors;

(a1ii) segregating each feature vector in the sub-events according to which speaker the feature vector originated from;

(a1iii) for each speaker s, determining an anchor point of the feature vectors in each of the sub-events i, given by $X_i(s)$;

(a1iv) defining the degree of tying between sub-events $E_1$ and $E_2$ is based on a cross-covariance matrix between $E_1$ and $E_2$ by $$K_{12} = \sum_s \omega_s \bar{X}_2(s) \bar{X}_1(s)^T$$

where the summation is over all the speakers; and (a1v) computing a transformation matrix for every pair of sub-events using the quantity $$\Gamma_{12} = U_{12} V_{12}^T \qquad (6)$$

to represent the least squares rotation that must be applied to $X_1(s)$ in sub-event $E_1$ in order to obtain an estimate of $X_2(s)$ in sub-event $E_2$.

24. A computer-readable medium as in claim 5 wherein instruction (a2) further includes the instruction of:

(a2i) determining which sub-events $E_j$ are closely correlated with $E_i$ by a distance measure $$D(\Gamma_{ij}) = \|I - \Gamma_{ij}\|^2$$

and $$\lambda_j = 1 - \frac{D(\Gamma_{ij})}{\max_j D(\Gamma_{ij})}$$

which is computed for each $E_j$, and wherein $\lambda_j$ has a value that ranges from one to zero, where a value of one represents a maximum degree of tying.

25. A computer-readable medium as in claim 6 wherein instruction (a2) further includes the instruction of:

(a2ii) creating a neighborhood for sub-event $E_i$ by excluding those sub-events $E_j$ from the neighborhood whose value of $\lambda_j$ deviates from the maximum value of $\lambda$ by more than a pre-determined percentile.

26. A computer-readable medium as in claim 6 wherein instruction (a2) further includes the instruction of:

(a2iii) creating a neighborhood for sub-event $E_i$ by ranking each $E_j$ from the highest value of $\lambda_j$ to the lowest, and by including in the neighborhood only a predetermined number of sub-events $E_j$ that have the highest ranked values of $\lambda_j$.

27. A computer-readable medium as in claim 8 wherein instruction (c1) further includes the instruction of:

(c1i) calculating $$\hat{Z}_j = (S_j^{1/2} \lambda_j \Gamma_{ij} S_i^{-1/2}) Z_i + (M_j - s_j^{1/2} \lambda_j \Gamma_{ij} S_i^{-1/2} M_i)$$

wherein $Z_i$ denotes a first feature vector from the adaptation data assigned to sub-event $E_i$, which is used to obtain an estimate of an unobserved feature vector $\hat{Z}_j$ in sub-event $E_j$ that is contained in neighborhood of sub-event $E_i$.

28. A method of performing speaker adaptation in a speech recognition system which includes a set of reference models corresponding to speech data, the speech data represented by a first and second reference model, the first reference model comprising a first sub-event and second reference model comprising a second sub-event, wherein the first sub-event is well populated with a plurality of feature vectors and the second sub-event is sparsely populated with feature vectors, the method comprising the steps of:

(a) computing a transformation between the first and second sub-event to indicate a degree of lateral tying between the first and second sub-event;

(b) assigning a new feature vector extracted from adaptation data to the first sub-event;

(c) if the computed transformation indicates a degree of lateral tying that surpasses a desired threshold, applying the computed transformation to the feature vectors in the first sub-event to transform the feature vectors into the space of the second sub-event to thereby populate the second sub-event with feature vectors from the first sub-event; and (d) adapting the reference models that correspond to the populated sub-events to account for speech pattern idiosyncrasies of the new speaker, thereby reducing the error rate of the speech recognition system.

29. A method as in claim 28 wherein step (c) further includes the steps of:

(c1) segregating each feature vector in the sub-events according to which speaker the feature vector originated from;

(c2) for each speaker s, determining an anchor point of the feature vectors in each of the sub-events i, given by $X_i(s)$;

(c3) defining the degree of tying between sub-events $E_i$ and $E_2$ is based on a cross-covariance matrix between $E_1$ and $E_2$ by $$K_{12} = \sum_s \omega_s \bar{X}_2(s) \bar{X}_1(s)^T$$

where the summation is over all the speakers; and (c4) computing a transformation matrix between sub-events $E_1$ and $E_2$ using the quantity $$\Gamma_{12} = U_{12} V_{12}^T \qquad (6)$$

to represent the least squares rotation that must be applied to $X_1(s)$ in sub-event $E_1$ in order to obtain an estimate of $X_2(s)$ in sub-event $E_2$.

30. A method as in claim 29 wherein step (b) further includes the steps of:

(b1) acquiring the speech from the new user in the form of input speech signals;

(b2) transforming the input speech signals into a physical representation;

(b3) extracting acoustic features from the physical representation and generating a series of feature vectors therefrom; and (B4) determining what allophone each feature vector represents and assigning each feature vector to the sub-event representing the corresponding allophone.

* * * * *

UNITED STATES PATENT AND TRADEMARK OFFICE
CERTIFICATE OF CORRECTION

PATENT NO : 5,737,487
DATED : April 7, 1998
INVENTOR(S): Bellegarda, et al.

It is certified that error appears in the above-identified patent and that said Letters Patent are hereby corrected as shown below:

In the claims:

In Claim 29, at column 16, line 27, delete "$E_i$" and insert - - $\mathbf{E_I}$ - -.

Signed and Sealed this

Twenty-first Day of September, 1999

Attest:

Q. TODD DICKINSON

*Attesting Officer*  *Acting Commissioner of Patents and Trademarks*